INVENTORS
Raymond McKibbin
Normand Bergeron

BY Albert Gordon
ATTORNEY

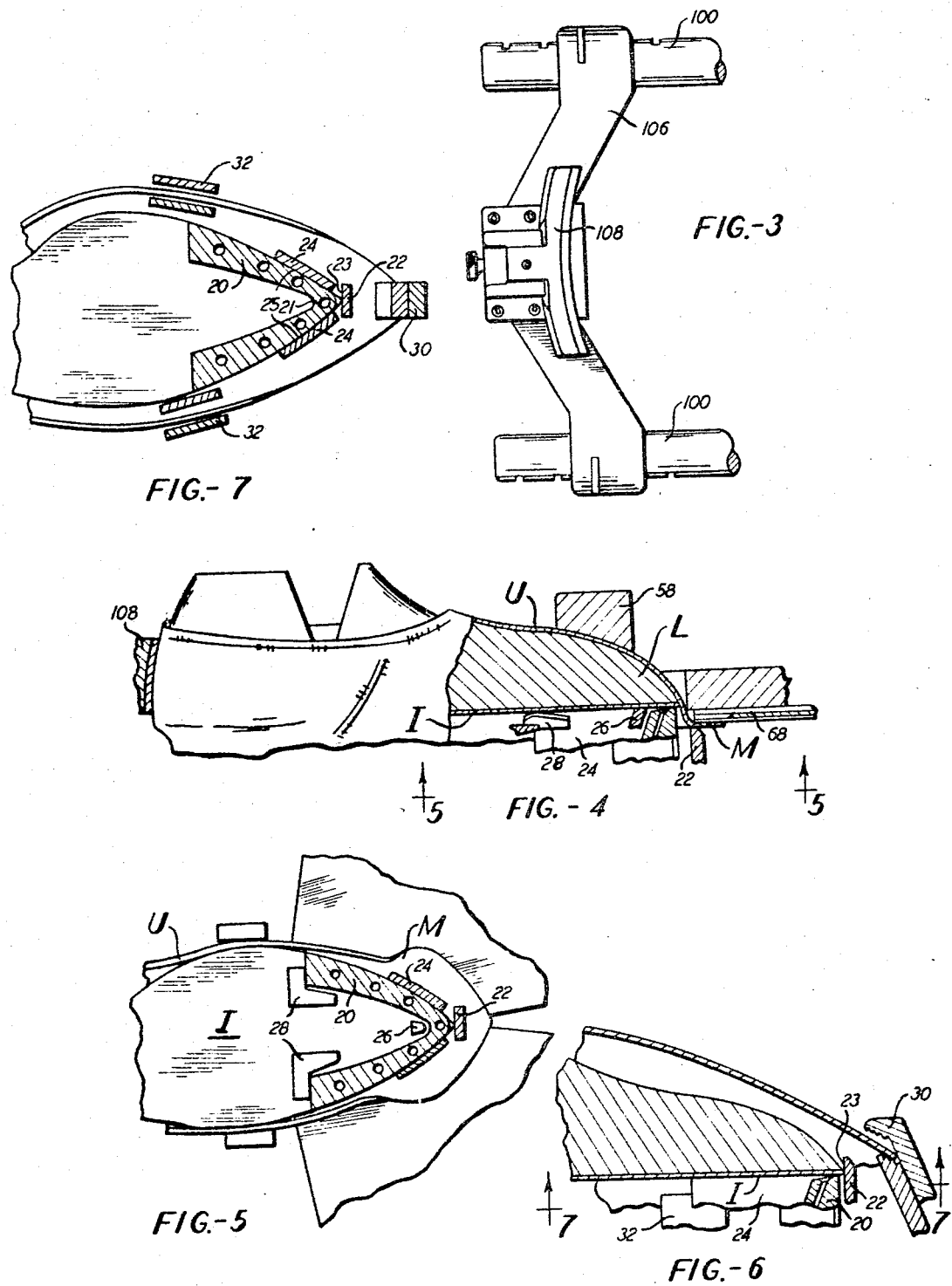

3,365,736
APPARATUS FOR CONVEYING A WORKPIECE FROM A MACHINE

Raymond McKibbin and Normand Bergeron, Montreal, Quebec, Canada, assignors to Jacob S. Kamborian, Boston, Mass.
Filed Nov. 8, 1965, Ser. No. 506,738
12 Claims. (Cl. 12—1)

ABSTRACT OF THE DISCLOSURE

The instant disclosure is concerned with a shoe machine having shoe operating instrumentalities adapted to perform shoe making operations on one end of a shoe assembly. Means are provided for supporting the shoe assembly in a predetermined position. An end clamping unit is incorporated into the machine in such a manner as to be movable towards and away from the other end of the supported shoe assembly so as to be alternatively in engagement with said other end of the shoe assembly or remote from said shoe assembly when supported in said predetermined position.

An inclined gravity conveyor is supported in the machine in a disposition such that the receiving end, which is at a higher elevation than the delivery end, is located below the predetermined position in which the shoe assembly is supported so that when the shoe is released from its support it may fall directly onto the conveyor and be carried away from the machine.

---

The instant invention is intended to be an improvement over the apparatus for lasting the toe end of a shoe assembly disclosed in United States application Ser. No. 472,525, filed July 16, 1965. More specifically it is concerned with providing a conveyor which is adapted to receive the shoe assembly after it has been lasted in the aforementioned machine and then cause the lasted shoe to be transported to position remote from the operative part of the machine where the shoe may be temporarily stored, thus permitting the operator to immediately present another shoe assembly to the apparatus and postponing the manipulation of transferring the previously lasted shoe assembly to a more permanent storage location until a time when the apparatus is automatically lasting the subsequently presented shoe assembly and does not require the operator's close attention. The conveyor may be of a flexible construction so as to permit it to be mounted to movable parts of the machine. Thus, the length of time that the apparatus is idle may be reduced with the result that a more efficient manufacturing operation may be realized.

The invention is described in greater detail below wherein:

FIGURE 3 is a plan view of the heel clamp;

FIGURE 4 is a side elevation of the shoe assembly prior to operation of the wiping mechanism with the toe portion thereof shown in section to illustrate the relative position of the insole rests, cement applicator, retarders, wipers and holddown;

FIGURE 5 is a view of the underside of the shoe assembly taken along the line 5—5 of FIGURE 4;

FIGURE 6 is a sectional view of the toe end of the shoe assembly just after it has been presented to the machine but before the pincers have gripped the upper;

FIGURE 7 is a view of the underside of the shoe assembly taken along the line 7—7 of FIGURE 6;

Figure 1:
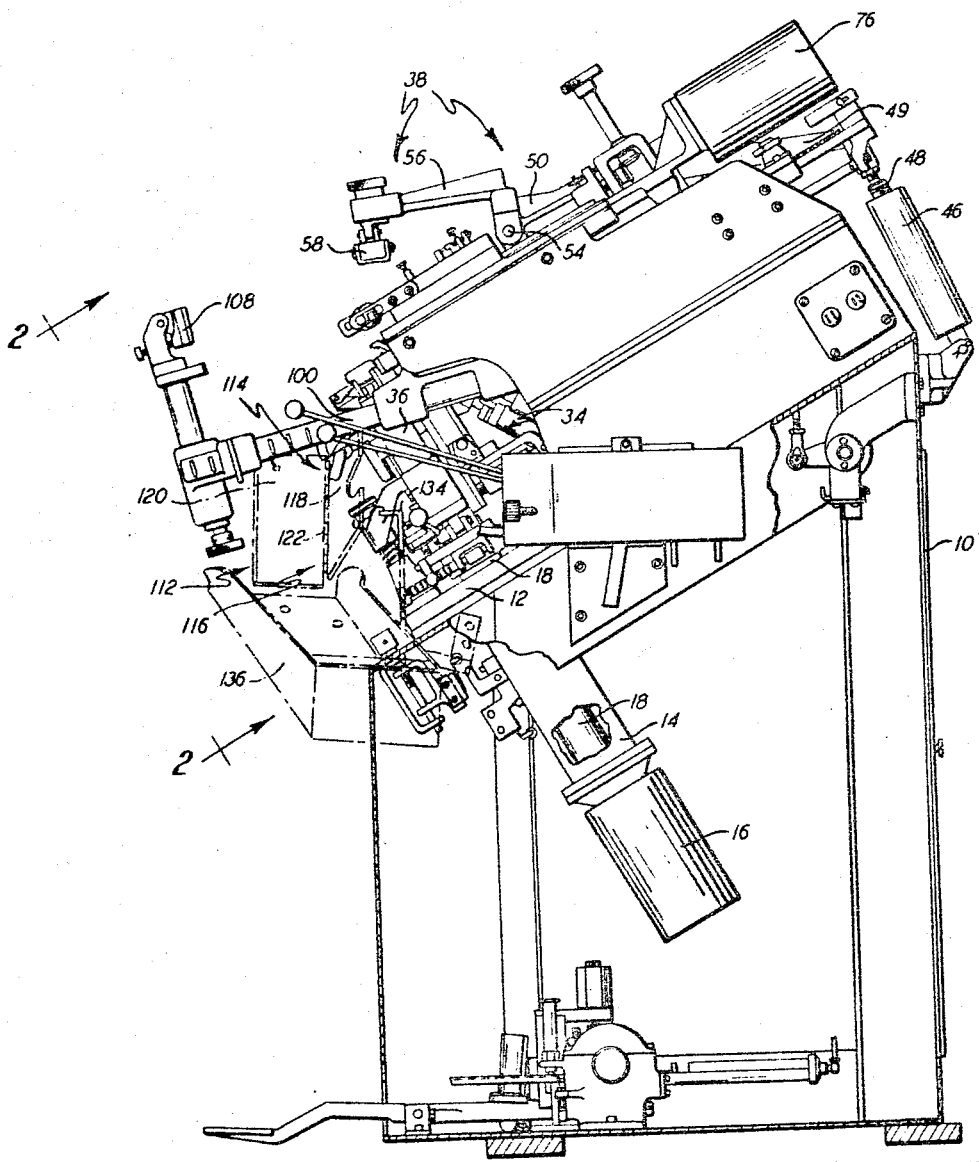
FIGURE 1 is a side elevation of the machine with the chute and catch bag illustrated in phantom.

Referring to FIGURE 1, the apparatus is identical to that disclosed in the aforementioned United States application Ser. No. 472,525, filed July 16, 1965, and includes a frame 10 that incorporates a base plate 12 that has a sleeve 14 extending downwardly therefrom. For convenience of operation, the machine is inclined approximately 30 degrees from the horizontal. However, parts extending in the direction of the plate 12 will hereinafter be referred to as extending horizontally and parts extending in the direction of the sleeve 14 will hereinafter be referred to as extending vertically. The operator is intended to be located to the left of the machine as seen in FIGURE 1, and a direction extending toward the operator (right to left in FIGURE 1) will be referred to as "forward" whereas a direction extending away from the operator (left to right in FIGURE 1) will be referred to as "rearward."

An air operated motor 16 is secured to the bottom of the sleeve 14 and has a piston rod (not shown) extending upwardly within the sleeve. A toe post 18 is secured to the piston rod of the motor 16 and is guided within the sleeve 14 for sliding vertical motion, means being provided for the preclusion of rotary motion of the toe post 18. As disclosed in the aforementioned United States application, the upper end of the toe post 18 extends beyond the level of the base plate 12 and has mounted to its upper extending end devices for supporting a shoe assembly, which includes a last having an insole located at its bottom and a shoe upper draped thereabout. Also mounted on the upper end of the toe post 18 are devices for initially locating the shoe assembly in a predetermined position, gripping and pulling over the upper about the last to stretch it thereabout, and extruding an adhesive onto the shoe parts which are to be lasted.

Figure 2:
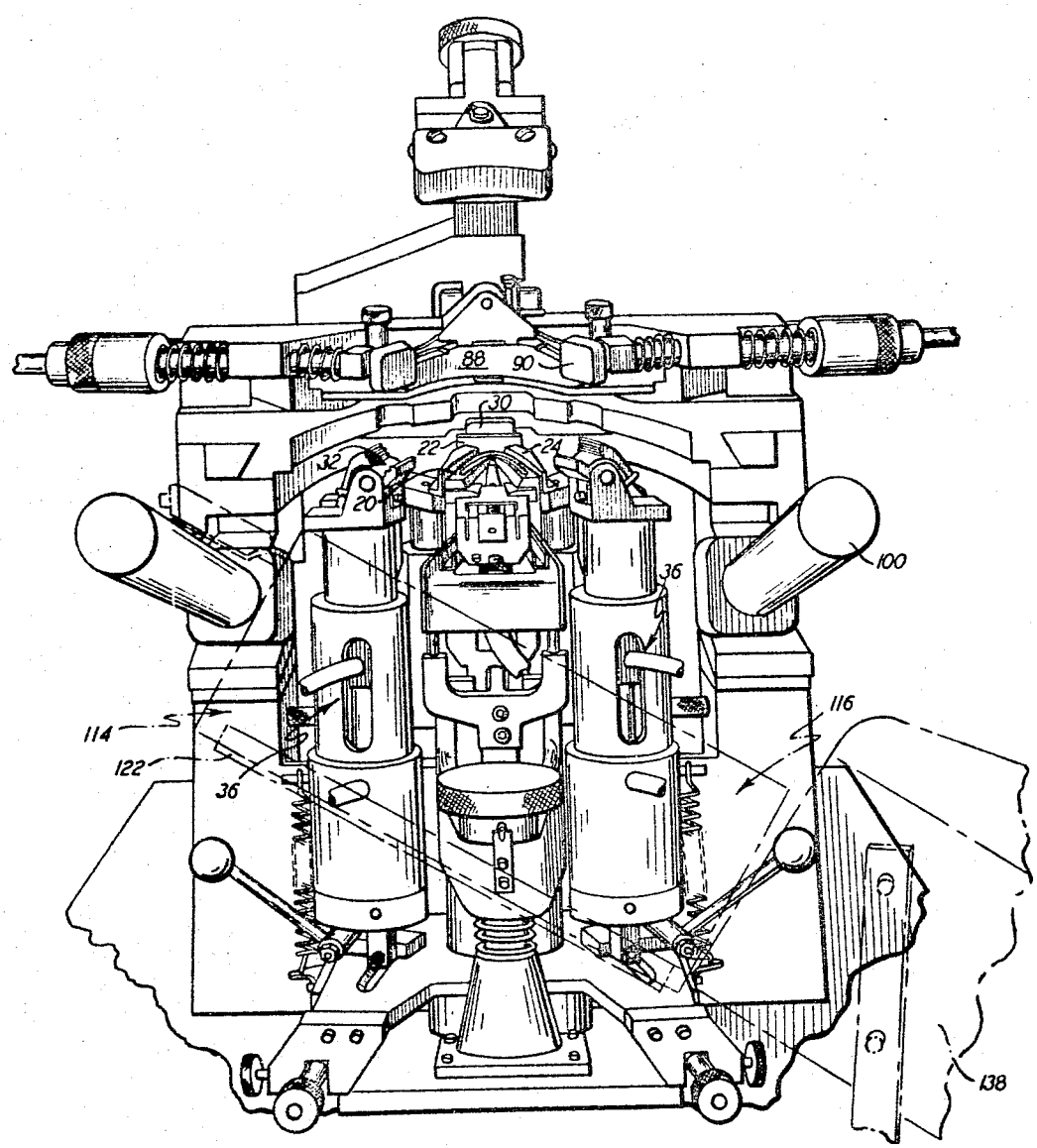
FIGURE 2 is a view of the front of the machine taken along the line 2—2 of FIGURE 1 and illustrating the mechanisms which are operative to prepare the shoe assembly for the wiping operation with the chute and catch bag illustrated in phantom.

Referring to FIGURES 2, 6 and 7 a U-shaped adhesive applicator 20 having a pair of diverging and forwardly extending legs and adapted to bear against the bottom of an insole I is provided which is supported on springs (not shown) which are in turn indirectly mounted to the toe post 18 so that the applicator 20 may yield downwardly with respect to the toe post 18 when an insole I is brought to bear against its uppermost surface. Means are also provided, for a purpose later described, for withdrawing the cement applicator 20 and its attendant supports downwardly from the insole I to an out-of-the-way position.

Located adjacent and rearwardly of the bight 21 of the cement applicator 20 is a toe retarder 22 which is indirectly mounted to the toe post 18 so as to be yieldably urged in an upward direction (for a purpose later described). The toe retarder 22 is additionally provided with means for relaxing the upwardly directed force thereon so that the toe retarder and its supporting members may be moved downwardly to an out-of-the-way position. A pair of side retarders 24 are similarly supported on the toe post 18 and are located forwardly of the retarder 22 and adjacent the periphery of the diverging legs of the cement applicator 22. When the apparatus is in an idle position, the upper surfaces of the toe and side retarders are substantially coplanar and are located at a greater elevation than the uppermost surface of the cement applicator 20. The toe and side retarders 22, 24 are provided with side surfaces 23, 25 which face the outer periphery of the cement applicator 20 and extend upwardly in a substantially vertical direction. As will later be described, the surfaces 23, 25 of the retarders 22, 24 serve as a gage in the operator's proper orientation of the shoe assembly in the machine.

Referring to FIGURES 4 and 5 it may be seen that also supported by the toe post is an insole rest 26 located at the bight of and between the divergent legs of the cement applicator. A pair of insole rests 28 are similarly mounted to the toe post and are located forwardly of the insole rest 26 and at the forward ends of the legs of the cement applicator 20. The uppermost surface of each of the insole rests 26, 28 lie in a substantially horizontal plane which, when the machine is in an idle position, is below the plane defined by the uppermost surface of the cement applicator 20. The insole rests 26, 28 are retractable in a downward direction in response to actuation of the motor 16 to cause the toe post 18 to be moved downwardly, but are not yieldably mounted as are the other aforementioned devices.

It may thus be seen that exclusive of adjustment features the cement applicator 20 and the retarders 22, 24 may have vertical motion which is both independent and unitary with the toe post 18 whereas the insole rests 26, 28 may have motion solely in unison with the toe post.

When placing a shoe assembly, which includes a last L having an insole I located at its bottom and a shoe upper U draped thereabout, in the apparatus, it is held by the operator with the toe of the shoe assembly pointing rearward. The insole I of the shoe assembly is placed on the uppermost surface of the cement applicator 20 and is urged rearwardly until the peripheral portions of the last L come into abutment with the side surfaces 23, 25 of the retarders 22, 24 thereby properly locating the shoe assembly in the machine. The marginal portion m of the shoe upper which is to be lasted to the insole I is manipulated by the operator so that it may overlie the uppermost surface of the retarders 22, 24 (see FIGURES 5 and 6).

With the shoe assembly in the above position, the overlying margin M of the upper is gripped at the toe portion thereof by toe pincers 30 and at the sides thereof by a pair of side pincers 32. The pincers 30, 32 are operatively associated with driving means 34, 36 which are effective to initially close the pincers 30, 32 to thereby grip the upper margin m at the toe and side portions thereof and to subsequently move downwardly to thereby stretch the upper U about the last L and cause it to tightly conform to the shape of the last. The downward pulling of the pincers 30, 32 causes the shoe assembly to bear against the cement applicator 20 with increased force, thus urging the cement applicator 20 downwardly and overcoming the resistance to downward motion which is offered by the springs on which the cement applicator is supported. The unitary downward motion of the pincers 30, 32, shoe assembly and cement applicator 20 is terminated when the bottom of the insole I is brought to bear against the insole rests 26, 28. At this point the pincers continue to stretch the upper about the last, the cement applicator being effective to press the marginal portion of the insole upwardly against the bottom of the last to aid in insuring a properly shaped shoe. The driving means 34, 36 for the pincers 30, 32 are supported by the toe post for unitary motion therewith in a vertical direction, so that the pincers 30, 32 may have motion which is both independent of and unitary with the toe post.

When the shoe assembly has been pulled into abutment with the insole rests and the upper has been stretched about the last by the pincers 30, 32, the motor 16 is activated to raise the toe post 18, thus raising the aforementioned devices and the pulled over shoe assembly in unison with the toe post 18, the positions of the aforementioned devices remaining unchanged with respect to the shoe assembly during this rise.

The toe post 18 is raised to a level at which a holddown device 38 and a wiping device 40, described below, are in a position relative to the shoe assembly so as to perform their respective functions thereon.

Figure 8:
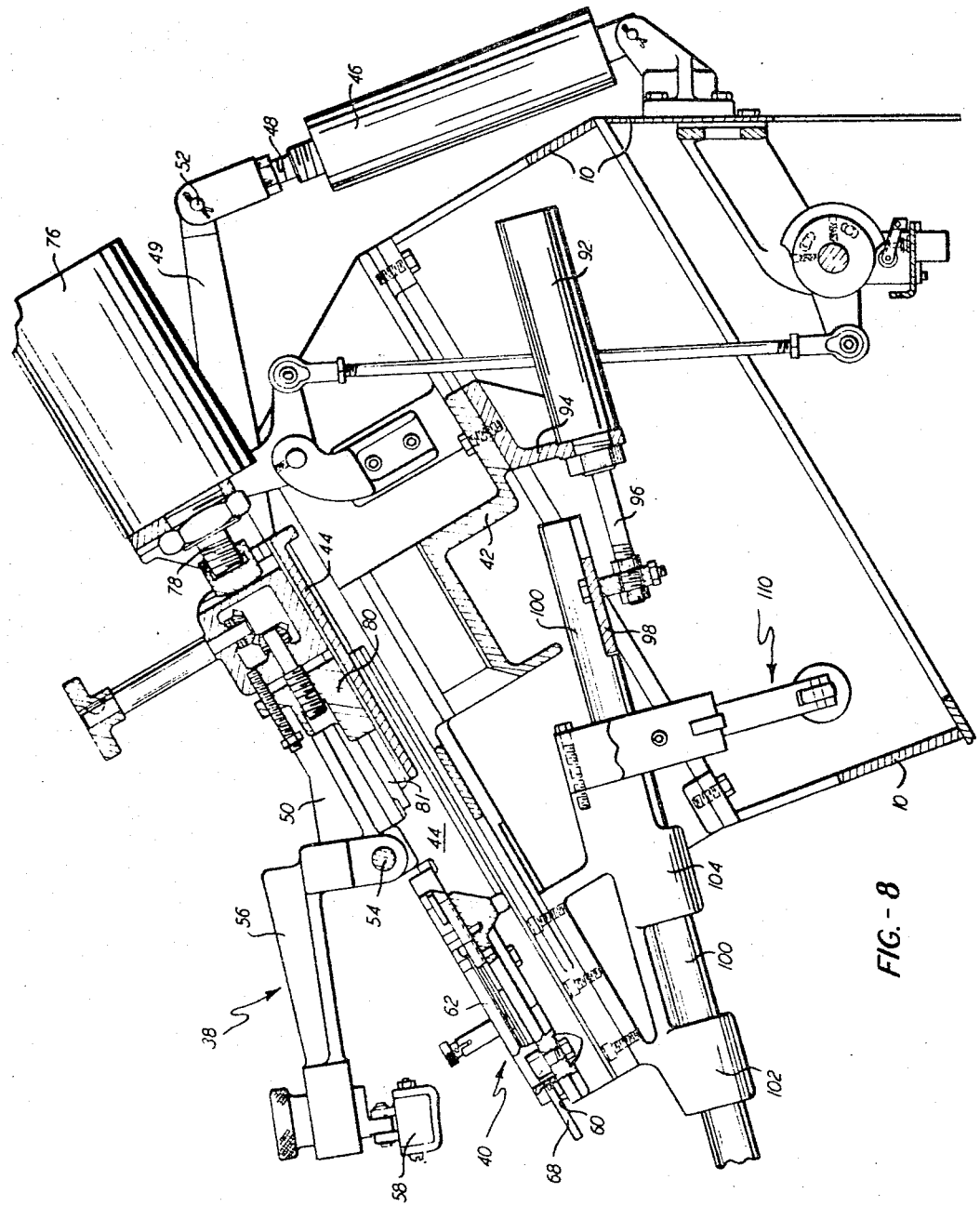
FIGURE 8 is a side elevation, partly in section, of the wiping holddown and heel clamp mechanisms.

Referring to FIGURE 8, mounted atop the base 10 is a head 42 which is receptive to a slide plate 44 which is mounted for sliding motion therein in a forward and rearward direction. A drive means (not shown), which is mounted to the frame 10 is operatively connected to the slide plate 44 so as to effect the forward and rearward sliding motion thereof. The holddown device 38 and the wiping device 40 are mounted to the slide plate 44 and are movable therewith so that when the slide plate 44 is in its most rearward position the holddown device 38 and the wiping device 40 may be out of the way so as not to interfere with the placement of the shoe assembly in the apparatus and the operator's inspection of the upper pulling over operation and so that when the slide plate 44 is brought to its most forward position the holddown device 38 and the wiping device 40 will be in position to perform their respective functions on the shoe assembly.

As illustrated in FIGURES 1 and 8, an air operated motor 46 is pivotally mounted to the rear of the frame 10 of the machine and has a piston rod 48 extending therefrom which is pivoted to the rearwardly extending end 49 of a holddown lever 50 at a pivot point 52. The lever 50 is pivotally mounted at its midportion to the slide plate 44 at a pivot point 54 and has a forwardly extending end 56 to which a holddown 58 is mounted. It may thus be seen that activation of the motor 46 is effective to swing the holddown lever 50 in a vertical plane about the pivot point 54 thereby causing the holddown 58 to be raised or lowered.

After the devices which are supported by the toe post 18 have stretched the shoe upper about the last and have otherwise prepared the shoe assembly for the remainder of the lasting operation, the slide plate 44 is caused to be moved to its forward position by its associated drive means thereby carrying the holddown device 38 and the wiping device 40 to similarly be carred to a forward, working position. When the slide plate 44 has reached its forward position the motor 16 is activated to raise the toe post 18 and thus the shoe assembly until a lug (not shown) secured to the toe post 18 abuts a mechanical stop (not shown) which is affixed to the frame 10. The lug and mechanical stop are cooperatively adjustable so that the level to which the shoe assembly is raised will always be such that the bottom surface of the insole is above the top surface of the wipers 68, described below, which are a part of the wiping device 40 (see FIGURES 4, 8 and 9), an amount that is approximately equal to the thickness of the margin M of the shoe upper U (see FIGURE 4).

Early in the rise of the toe post 18 the motor 46 is activated by air under relatively low pressure to cause the holddown 58 to move downwardly towards the vamp of the rising shoe assembly and to subsequently ride upwardly with the shoe assembly after the holddown has been brought to bear against the vamp of the shoe. When the toe post 18 and shoe assembly have been raised to the proper height with respect to the wipers 68 the shoe assembly will thus be clamped between the toe post 18 and the holddown 58, thereby maintaining it in a predetermined position in readiness for the wiping of the upper margin M to the insole I by the wiping device 40.

Figure 9:
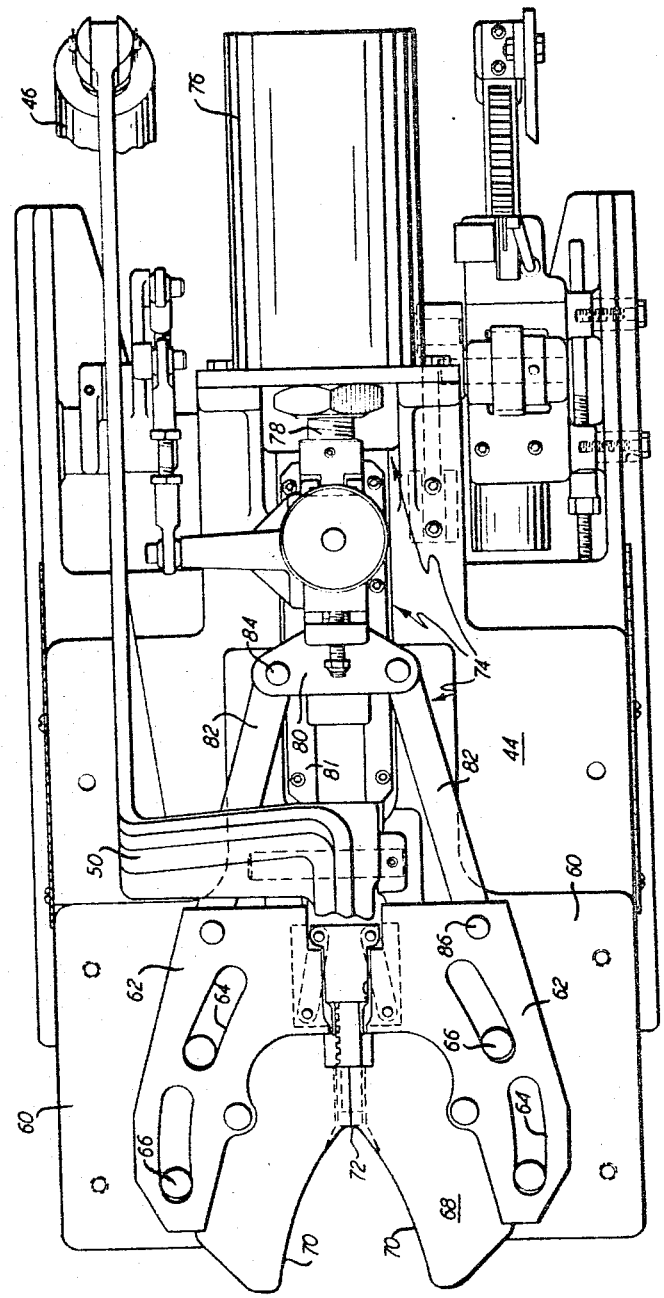
FIGURE 9 is a plan view of the wiping mechanism.

Referring to FIGURES 8 and 9 the slide plate 44 has a smooth upper surface 60 formed at its forward end. A pair of symmetrically disposed wiper cams 62 are slidably supported on the surface 60 and are provided with cam slots 64. Pins 66 are rotatably mounted to the forward end of the slide plate 44 and extend upwardly from the upper surface 60 thereof to be received by the cam slots 64 of the wiper cams 62. The cam slots 64 are of a configuration which serves to restrict the motion of the wiper cams 62 to a desired predetermined motion. Wipers 68 are connected to and extend forwardly of the wiper cams 62. The wipers 68, as is conventional, are flat plates having forwardly divergent edges 70 that diverge from a vertex 72. The wiper cams 62, and thus the wipers 68 are actuated by a drive means 74 which is supported on the slide plate 44 so as to be carried thereby and includes an air operated motor 76, secured to the rear of the slide plate and having a piston rod 78 which is in turn ultimately connected to a block 80. The block 80 is mounted in gibs 81 on the slide plate 44 which guide and restrict the block 80 to motion in a forward-rearward direction. A pair of links 82 have one end of each pivotally mounted to the block at pivots 84 and the other end of each pivotally mounted to a wiper cam 62 at pivots 86. Thus it may be seen that activation of the motor 76 serves to slide the block 80 forwardly thereby urging the links 82 and consequently the wiper cams 62 and wipers 68 in a forward direction, the wiper cams 62 and wipers 68 being guided in their motion by the interaction of the rollers 66 and the cam slots 64 in the wiper cams 62. The configuration of the cam slots 64 is such that the wipers 68 initially swing towards each other about the vertex 72. This is followed by a compound movement comprising a concomitant forward translatory movement of the wipers 68 and inward swinging movement of the wipers about the vertex. The wiper stroke thus concludes with a forward translation of the wipers without swinging movement.

For reasons fully disclosed in the aforementioned application Ser. No. 472,525 filed July 16, 1965, it is necessary, at some time prior to the actual wiping of the shoe upper to the insole, but after the upper has been stretched about the last, for the pincers 30, 32 to release their grip on the margin M of the upper. As a result it becomes necessary at this time to provide auxiliary means for maintaining the upper in its pulled over condition about the last. A Teflon yoke 88 and a pair of rubber bumpers 90 (see FIGURE 2) are provided and are associated with mechanisms fully described in the aforementioned pending application which are operative to effect a tight pressing of the upper to the last and thus aid in maintaining the upper in its pulled over condition upon release of the pincers 30, 32. Also effective in maintaining the upper in its pulled over condition is the cooperation between the retarders 22, 24 and the bottom surface of the wipers 68. The machine is so constructed that when the slide plate 44 has been moved to a forward working position the portions of the bottom surface of the wipers 68 that are adjacent the forward edges 70 thereof are located directly above the uppermost surfaces of the retarders 22, 24 so that when the toe post 18 and shoe assembly are raised, the upper margin M, which had been originally draped over the retarders when the shoe assembly was introduced to the machine, will be pressed and gripped between the upper surfaces of the retarders 22, 24 and the bottom surface of the wipers 68. As mentioned earlier, the retarders, at this stage in the cycle of the machine, are yieldably urged upwardly so that during the raising of the toe post 18 and shoe assembly the upper margin may be initially sandwiched between the retarders 22, 24 and the wipers 68 under relatively light force and as the toe post 18 continues its rise to lift the shoe assembly to the aforementioned predetermined position, sandwich the upper margin under an increased force.

Inasmuch as a substantial portion of the wiper stroke includes motion having a forwardly directed component, it is necessary to provide a resistance to the resulting forwardly directed forces in order to maintain the shoe assembly in its predetermined position throughout the complete wiping stroke. Referring to FIGURES 3 and 8 an air actuated motor 92 is secured to a hanger 94 depending from the head 42 and has a piston rod 96 which is connected by way of a plate 98 to a pair of bars 100 that are slidably guided in bosses 102, 104 affixed to the frame 10. The bars 100 are so constructed as to extend forwardly of the toe post 18 and shoe assembly. A yoke 106 is mounted to the forwardly extending ends of the bars 100 so as to straddle them and serves as a support for a heel clamp 108 which is adjustably mounted thereon.

When in an idle, non-working position, the forward ends of the bars 100 and consequently the heel clamp 108 are located forwardly of and spaced from the heel end of the shoe assembly (when the shoe assembly is in its predetermined position). Actuation of the motor 92 serves to draw the bars 100 rearwardly towards the heel end of the shoe and thus cause the heel clamp 108 to bear against the heel end of the shoe assembly as illustrated in FIGURE 4. Brake means 110 fully described in the aforementioned pending application are provided to lock the bars in position when the heel clamp 108 is in abutment to the heel end of the shoe assembly to thereby insure that the forward motion of the wipers 68 is fully resisted by the heel clamp 108 so that the shoe assembly may be rigidly maintained in its predetermined position throughout the wiping operation.

Upon completion of the lasting operation, the control system (not shown) which is incorporated into the machine causes the aforementioned mechanisms and devices to be returned to their original idle, non-working position, thus simultaneously setting up the machine for acceptance of a fresh shoe assembly and releasing the gripping and clamping members from the lasted shoe assembly so that the shoe assembly may fall from the insole rests. The inclination of the shoe assembly supporting devices insures that the shoe assembly will be so released.

The above description of the machine is general in nature and is provided merely for the purpose of illustrating the setting of the instant invention therein, there being a complete and detailed disclosure of the machine in the aforementioned United States application Ser. No. 472,525, filed July 16, 1965.

Figure 10:
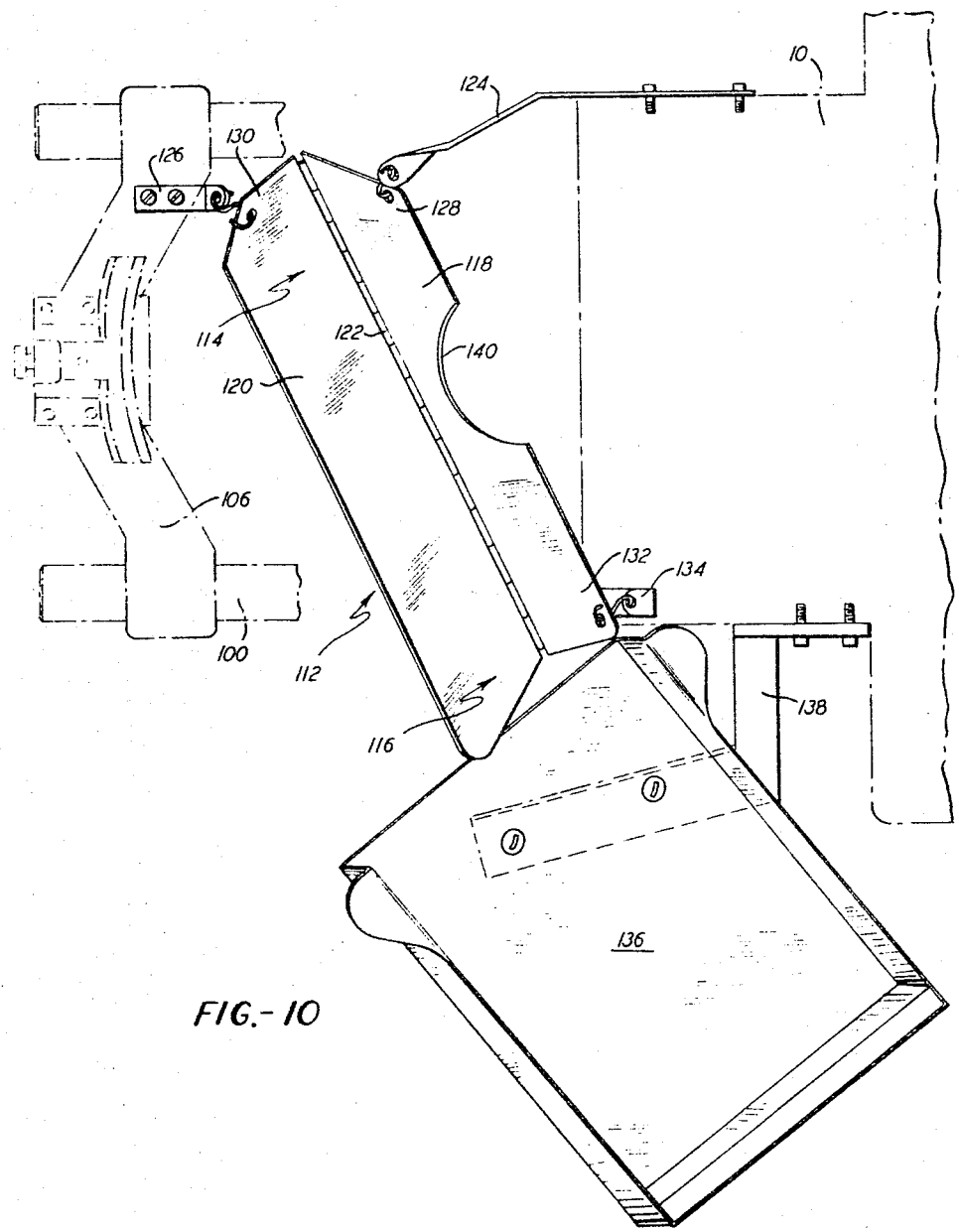
FIGURE 10 is a plan view of the chute and catch bag.

Referring to FIGURES 1 and 10 a chute 112, having a receiving end 114 and a delivering end 116 is mounted to the machine. In the illustrative embodiment of the invention the chute is formed from a first plate 118 and a second plate 120 which is connected to the first plate 118 by means of a hinge 122 which runs lengthwise of the plates 118, 120 to thereby form a V-shaped trough therebetween.

The receiving end 114 of the chute 112 is suspended between a bracket 124 which is secured to the yoke 106, with the first plate 118 being suspended at a corner 128 thereof from the bracket 124 and the second plate 120 being suspended at a corner 130 thereof from the bracket 126. The delivering end 116 of the chute 112 is suspended at a corner 132 of the first plate 118 by means of a bracket 134 which is secured to the frame 10. The brackets 124 and 126 are at substantially the same elevation and the bracket 134 is at a lower elevation than the brackets 124 and 126 thereby causing the chute 112 to be oriented in a direction which is downwardly inclined from the receiving end 114 to the delivering end 116 thereof. The brackets 124, 126 and 130 are so located as to cause the chute 112 to traverse the front of the machine and to have the receiving end 114 thereof below the aforementioned predetermined position of the shoe assembly so that when the machine has completed its function of lasting the toe end of the shoe assembly and the various instrumentalities and devices thereof have released the shoe assembly, the lasted shoe may fall from its predetermined position in the machine into the receiving end 114 of the chute 112 whereupon it may slidingly gravitate towards the delivering end 116 thereof. A catch bag 136 is secured to the frame 10 by means of a bracket 138 and is so located as to be receptive to the shoe assembly when it slides out of the delivering end 116 of the chute 112. The lasted shoe assembly may thus be transferred from the machine to the catch bag 136 without the performance of any manipulative steps on the part of the operator, thus permitting him to present a new shoe assembly to the machine as soon as the machine has returned to its idle position. The operator may transfer the lasted shoe from the catch bag 136 to a more permanent storage location while the machine is operating automatically and does not require his closest attention.

Inasmuch as the brackets 124 and 134 are rigidly secured to the frame 10 of the machine, the rear plate 118 which is mounted thereto will remain substantially below the predetermined position of the shoe assembly at all times during the operation of the machine. The front plate 120, by means of its hinged connection to the rear plate 118 will also remain substantially below the predetermined position of the shoe assembly so that the chute 112 may always be in a position to receive the shoe assembly. The loose suspension of the plates 118, 120 from the brackets 124, 126, 130 and the hinged connection between the plates thus provides a chute of flexibility sufficient to permit forward and rearward movement of the yoke 106 and its attendant heel clamp 108 without interference from the chute. The dimensions of the plates 118, 120 and the aforementioned members by which they are suspended should be such that the plates 118, 120 form a trough both when the heel clamp 108 is in its forward, non-working position and in its rearward, working position, the trough thus formed being wider when the heel clamp is in its forward position and narrower when in its rearward position. In the illustrative embodiment of the invention a recess 140 is formed in the rear plate 118 to provide clearance for the toe post 18.

It should be understood that the present disclosure is for the purpose of illustration only and that the invention includes all modifications and equivalents which fall within the scope of the appended claims.

We claim:
1. In a shoe machine having means for supporting a shoe assembly in a predetermined position and at least one shoe manufacturing instrumentality being so constructed as to have relative movement with respect to another portion of said machine, said supporting means being effective to release said shoe assembly after said shoe operating shoe instrumentality has performed its shoe-making function, the improvement comprising:
   a conveyor having a receiving end and a delivering end, said receiving end being disposed beneath said predetermined location of said shoe assembly whereby said conveyor may receive said released shoe assembly and cause said shoe assembly to be delivered at the delivering end of said conveyor; and
   means mounting said conveyor to said shoe operating instrumentality and said portion of said machine in such a manner that portions of said conveyor may have relative movement with respect to each other in unison with said relative movement of said shoe manufacturing instrumentality and said portion of said machine to which said conveyor is mounted,
   said conveyor being flexibly constructed so as to enable said relative movement of said portions thereof.

2. An apparatus as recited in claim 1 further comprising:
   a catch bag mounted to said machine in such a manner as to be receptive to said shoe assembly when said shoe assembly is expelled from the delivering end of said conveyor.

3. A shoe machine comprising:
   means for supporting a shoe assembly;
   means for performing shoe manufacturing operations on said shoe assembly;
   means for initially maintaining said shoe assembly in rigid position on said supporting means in preparation for performance of said shoe manufacturing operations and subsequently releasing said shoe assembly from said rigid position after completion of said shoe manufacturing operation and including a clamping member mounted for movement between a first position remote from said shoe supporting means and a second position adjacent said shoe supporting means;
   drive means operatively associated with said clamping member to effect movement thereof from said first to said second position to aid in maintaining said shoe assembly in said rigid position and from said second to said first position to release said shoe assembly; and
   an inclined chute having a receiving end and a delivering end, said receiving end being located beneath said supporting means so as to be receptive to said shoe assembly and being at a greater elevation than said delivering end, said chute having one portion thereof mounted to said clamping member and being movable therewith and another portion thereof mounted to a stationary portion of said machine, said chute being flexible so as to partake of the movement of said clamping member,
   whereby upon completion of said shoe manufacturing operations said means for maintaining said shoe assembly in rigid position may be caused to release said shoe assembly, said drive means being operative to move said clamping member from said second position to said first position, whereby said shoe assembly may fall into the receiving end of said chute whereupon said shoe assembly may gravitate towards said delivering end.

4. An apparatus as recited in claim 3 further comprising:
   a catch bag mounted to said machine in such a manner as to be receptive of said shoe assembly when said shoe assembly is expelled from the delivering end of said chute.

5. A shoe machine comprising:
   means for supporting a shoe assembly in a predetermined position;
   means for performing shoe manufacturing operations on said shoe assembly while in said predetermined position;
   means for clamping said shoe assembly, said clamping means being operative to engage and maintain said shoe assembly in rigid location during the performance of said shoe manufacturing operations and to disengage and release its clamping effect on said shoe assembly upon completion of the performance of said shoe manufacturing operations; and
   an inclined chute having one portion thereof mounted to said movable clamping means and another portion thereof mounted to a stationary portion of said machine and having one end thereof located beneath said predetermined position at least upon disengagement of said clamping means, whereby said end of said chute may be receptive to said shoe assembly so that upon completion of the performance of said shoe manufacturing operations said clamping means may become disengaged from said shoe assembly thereby permitting said shoe assembly to fall into the receptive end of said chute whereupon the inclination of said chute may permit said shoe assembly to gravitate along said chute to a delivery station, said chute being so constructed and arranged as to be capable of flexing when said clamping means is moved between an engaging and a disengaging position with respect to said shoe assembly.

6. An apparatus as recited in claim 5 further comprising:
a catch bag mounted to said machine in such a manner as to be receptive to said shoe assembly when said shoe assembly is expelled from the delivering end of said chute.

7. A shoe machine comprising:
means for supporting in a predetermined position, a shoe assembly which includes a last, an insole located at the bottom of said last and a shoe upper draped about said last;
means for wiping, at one end of said shoe assembly, a portion of the margin of said shoe upper against a corresponding portion of the margin of said insole, while said shoe assembly is supported in said predetermined position, said wiping means including wipers which have a component of motion in a forward direction;
means for clamping said shoe assembly, said clamping means extending forwardly of said predetermined position and being so constructed and arranged as to be moveable towards and away from the other end of said shoe assembly in a forward-rearward direction;
drive means operatively associated with said clamping means and being so constructed and arranged as to initially effect movement of said clamping means rearwardly towards said other end of said shoe assembly so as to cause said clamping means to engage said other end of said shoe assembly and thus insure rigidity and preclude forward motion of said shoe assembly in response to the component motion in a forward direction of said wipers, and to subsequently effect movement of said clamping means forwardly and away from said other end of said shoe assembly thereby becoming disengaged from said shoe assembly upon completion of said wiping operation; and
an inclined chute having a receiving end and a delivering end, said receiving end being located beneath said predetermined position and being at a greater elevation than said delivering end, said chute having one portion thereof mounted to said clamping means and being moveable therewith and another portion of said chute being mounted to a stationary member of said machine, said chute being so constructed and arranged as to be flexible to permit such motion whereby upon disengagement of said clamping means from said other end of said shoe assembly, said shoe assembly may be dropped from said supporting means into the receiving end of said chute whereupon the inclination of said chute may cause said shoe assembly to gravitate along said chute towards the delivering end of said chute.

8. An apparatus as recited in claim 7 further comprising:
a catch bag mounted to said machine in such a manner as to be receptive to said shoe assembly when said shoe assembly is expelled from the delivering end of said chute.

9. A shoe machine comprising:
means for supporting, in a predetermined position, a shoe assembly which includes a last, an insole located at the bottom of said last and a shoe upper draped about said last;
means for wiping, at one end of said shoe assembly, a portion of the margin of said shoe upper against a corresponding portion of the margin of said insole while said shoe assembly is supported in said predetermined position, said wiping means including wipers which have a component of motion in a forward direction;
means for clamping said shoe assembly, said clamping means extending forwardly of said predetermined position and being so constructed and arranged as to be moveable towards and away from the other end of said shoe assembly in a forward-rearward direction;
drive means operatively associated with said clamping means and being so constructed and arranged as to initially effect movement of said clamping means rearwardly towards said other end of said shoe assembly was to cause said clamping means to engage said other end of said shoe assembly to thus insure rigidity and preclude forward motion of said shoe assembly in response to the component of motion in a forward direction of said wipers, and to subsequently effect movement of said clamping means forwardly and away from said other end of said shoe assembly thereby becoming disengaged from said shoe assembly upon completion of the wiping operation;
a first plate swingably suspended for limited universal movement from a stationary portion of said machine and having a lower edge of such configuration as to be oriented in a downwardly inclined direction;
a second plate swingably suspended for limited universal movement from said moveable clamping means and having a lower edge of such configuration as to be oriented in the same downwardly inclined direction as that of the lower, free edge of said said first plate; and
a hinge connecting the lower edges of said first and said second plates to thereby permit said plates to swing towards and away from each other about said hinge in response to motion of said clamping means towards and away from said shoe assembly, said plates and hinge defining a downwardly inclined chute having a receiving end at its uppermost portion and a dispensing end at its lowermost portion, said first and second plates being so suspended as to cause the receiving end of said chute to be located beneath said predetermined position of said shoe assembly whereby upon completion of said wiping operation and disengagement of said clamping means from said shoe assembly, said shoe assembly may fall from said shoe assembly supporting means into the receiving end of said chute whereupon said shoe assembly may gravitate along said chute towards said dispensing end.

10. An apparatus as recited in claim 9 further comprising:
a catch bag mounted to said machine in such a manner as to be receptive to said shoe assembly when said shoe assembly is expelled from the delivering end of said chute.

11. An apparatus as recited in claim 9 wherein said means for clamping said shoe assembly comprises:
at least two bosses, rigidly secured to said machine and located laterally and on opposite sides of said shoe assembly supporting means, said bosses being slidably receptive to said bars and being so constructed and arranged as to restrict said bars to motion which is in a substantially forward and rearward direction and which is along the longitudinal axis of each of said bars, each of said bars having one end thereof extending beyond and forwardly of said predetermined position of said shoe assembly;
a heel clamping member mounted to the forwardly extending ends of said bars for movement therewith, and being so located thereon as to be engageable with said other end of said shoe assembly upon operation of said drive means to effect movement of said clamping rearwardly towards said other end of said shoe assembly;

and wherein said second plate is suspended from said heel clamping member.

12. Apparatus as recited in claim 11 further comprising:
a catch bag mounted to said machine in such a manner as to be receptive of said shoe assembly when said shoe assembly is expelled from the delivering end of said conveyor.

References Cited

UNITED STATES PATENTS

| 2,409,643 | 10/1946 | Robinson | 12—1 |
| 2,908,921 | 10/1959 | Kant | 12—1 |
| 3,077,619 | 2/1963 | Hidden et al. | 12—1 |

PATRICK D. LAWSON, *Primary Examiner.*